(12) United States Patent
Kang et al.

(10) Patent No.: US 8,251,049 B2
(45) Date of Patent: Aug. 28, 2012

(54) ADAPTIVE INTAKE OXYGEN ESTIMATION IN A DIESEL ENGINE

(75) Inventors: Jun-Mo Kang, Ann Arbor, MI (US);
Ibrahim Haskara, Macomb, MI (US);
Chen-Fang Chang, Troy, MI (US);
Yue-Yun Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 382 days.

(21) Appl. No.: 12/693,613

(22) Filed: Jan. 26, 2010

(65) Prior Publication Data

US 2011/0184632 A1    Jul. 28, 2011

(51) Int. Cl.
*F02D 41/00* (2006.01)
*G06F 19/00* (2006.01)

(52) U.S. Cl. ..... 123/676; 701/108; 701/109; 73/114.33; 73/114.73

(58) Field of Classification Search ................. 123/676, 123/568.21; 73/114.31, 114.33, 114.73; 701/108, 109
See application file for complete search history.

(56) References Cited

U.S. PATENT DOCUMENTS

| | | | | |
|---|---|---|---|---|
| 6,095,127 | A * | 8/2000 | Kolmanovsky et al. | 123/676 |
| 7,107,143 | B2 * | 9/2006 | Kang | 701/114 |
| 7,117,078 | B1 * | 10/2006 | Gangopadhyay | 701/103 |
| 7,946,162 | B2 * | 5/2011 | Vennettilli et al. | 73/114.73 |
| 8,001,834 | B2 * | 8/2011 | Vennettilli et al. | 73/114.32 |
| 8,051,834 | B2 * | 11/2011 | Vennettilli et al. | 123/403 |
| 8,103,427 | B2 * | 1/2012 | Osburn et al. | 701/108 |
| 8,103,428 | B2 * | 1/2012 | Russ et al. | 701/108 |
| 8,108,123 | B2 * | 1/2012 | Sarlashkar et al. | 701/103 |

FOREIGN PATENT DOCUMENTS

DE    102007060036 A1    7/2009

OTHER PUBLICATIONS

Grizzle, J.W., Cook, J.A., Milam, W.P., "Improved Cylinder Air Charge Estimation for Transient Air Fuel Ratio Control", Proceedings of the American Control Conference, Baltimore, Maryland, Jun. 1994.

* cited by examiner

*Primary Examiner* — Thomas Moulis

(57) ABSTRACT

A method for estimating an oxygen concentration in an intake manifold of a diesel engine utilizing exhaust gas recirculation includes monitoring engine operation, monitoring an exhaust gas recirculation valve, and monitoring an exhaust air fuel ratio. When the engine operates in steady state with the exhaust gas recirculation valve in the closed position, a volumetric efficiency for the engine is updated. A partial pressure due to exhaust gas recirculation within the intake manifold based upon the updated volumetric efficiency is determined, and an estimated oxygen concentration within the intake manifold based upon the partial pressure due to exhaust gas recirculation within the intake manifold and the exhaust air fuel ratio is determined. Operation of the engine is controlled based upon the estimated oxygen concentration within the intake manifold.

14 Claims, 5 Drawing Sheets

US 8,251,049 B2

ADAPTIVE INTAKE OXYGEN ESTIMATION IN A DIESEL ENGINE

TECHNICAL FIELD

This disclosure is related to control of diesel engines.

BACKGROUND

The statements in this section merely provide background information related to the present disclosure and may not constitute prior art.

Oxygen concentration in an intake manifold is an important variable for combustion performance and emissions for diesel and lean-burn engines in general. For lean burn engines with an external EGR mechanism, EGR flow also brings unused oxygen (or fresh air charge) back into the intake manifold through the EGR valve since not all the oxygen in the cylinder is used during combustion. A mass air flow (MAF) sensor may provide a feedback signal used to control in-cylinder EGR amount. Controlling the fresh air flow is an indirect way of controlling the in-cylinder EGR amount. However, such technique does not take into account the variability of unused oxygen coming to the intake manifold through the EGR valve and the dynamical oxygen contributions from throttle and EGR will be different at the mixing point (intake manifold) during engine transients, which will have an adverse impact on the transient EGR control. Similarly, using an estimated EGR flow rate alone to control the in-cylinder EGR amount is not going to be effective during transients because the dynamic responses of flows through the throttle and through the EGR valve will be different. On the other hand, the oxygen concentration in the intake manifold captures the end effects of the distinct flows and is, therefore, directly related to the in-cylinder EGR amount and NOx emissions. To this end, an engine controller requires an accurate estimate of the oxygen concentration in the intake manifold to robustly control the in-cylinder mixture and in turn combustion.

SUMMARY

A method for estimating an oxygen concentration in an intake manifold of a diesel engine utilizing exhaust gas recirculation includes monitoring engine operation, monitoring an exhaust gas recirculation valve, and monitoring an exhaust air fuel ratio. When the engine operates in steady state with the exhaust gas recirculation valve in the closed position, a volumetric efficiency for the engine is updated. A partial pressure due to exhaust gas recirculation within the intake manifold based upon the updated volumetric efficiency is determined, and an estimated oxygen concentration within the intake manifold based upon the partial pressure due to exhaust gas recirculation within the intake manifold and the exhaust air fuel ratio is determined. Operation of the engine is controlled based upon the estimated oxygen concentration within the intake manifold.

BRIEF DESCRIPTION OF THE DRAWINGS

One or more embodiments will now be described, by way of example, with reference to the accompanying drawings, in which.

DETAILED DESCRIPTION

Figure 1:
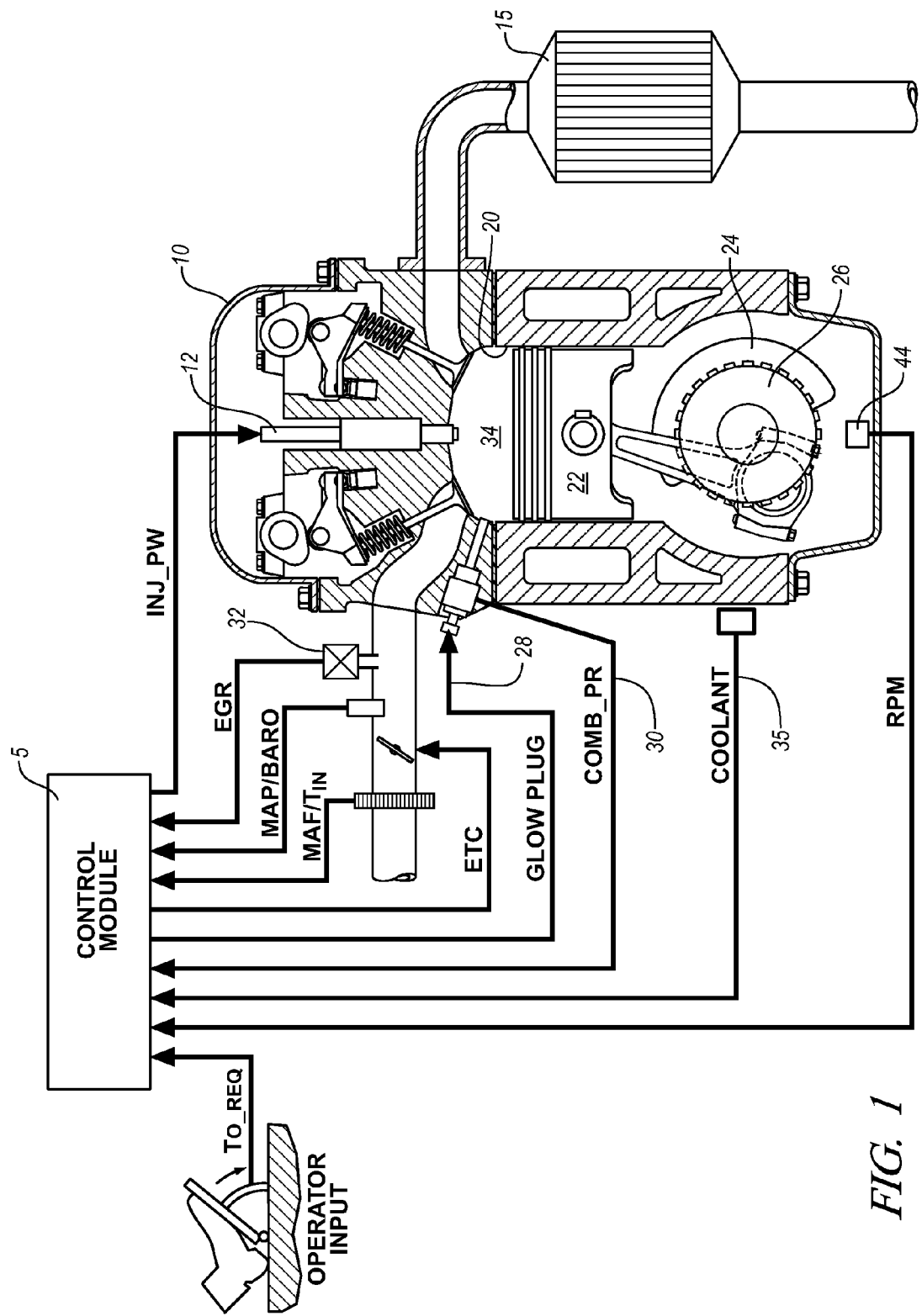
FIG. 1 is a sectional view of an internal combustion engine, in accordance with the present disclosure.

Referring now to the drawings, wherein the showings are for the purpose of illustrating certain exemplary embodiments only and not for the purpose of limiting the same, FIG. 1 is a schematic diagram depicting an exemplary internal combustion engine 10, control module 5, and exhaust aftertreatment system 15, constructed in accordance with an embodiment of the disclosure. The exemplary engine includes a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request ($T_{O\_REQ}$). The engine preferably employs a four-stroke operation wherein each engine combustion cycle includes 720 degrees of angular rotation of crankshaft 24 divided into four 180-degree stages (intake-compression-expansion-exhaust), which are descriptive of reciprocating movement of the piston 22 in the engine cylinder 20. A multi-tooth target wheel 26 is attached to the crankshaft and rotates therewith. The engine includes sensing devices to monitor engine operation, and actuators which control engine operation. The sensing devices and actuators are signally or operatively connected to control module 5.

The engine preferably includes a direct-injection, four-stroke, internal combustion engine including a variable volume combustion chamber defined by the piston reciprocating within the cylinder between top-dead-center and bottom-dead-center points and a cylinder head including an intake valve and an exhaust valve. The piston reciprocates in repetitive cycles each cycle including intake, compression, expansion, and exhaust strokes.

The engine preferably has an air/fuel operating regime that is primarily lean of stoichiometry. One having ordinary skill in the art understands that aspects of the disclosure are applicable to other engine configurations that operate primarily lean of stoichiometry, e.g., lean-burn spark-ignition engines. During normal operation of the compression-ignition engine, a combustion event occurs during each engine cycle when a fuel charge is injected into the combustion chamber to form, with the intake air, the cylinder charge. The charge is subsequently combusted by action of compression thereof during the compression stroke.

The engine is adapted to operate over a broad range of temperatures, cylinder charge (air, fuel, and EGR) and injection events. The methods described herein are particularly suited to operation with direct-injection compression-ignition engines operating lean of stoichiometry to determine parameters which correlate to heat release in each of the combustion chambers during ongoing operation. The methods are further applicable to other engine configurations, including spark-ignition engines, including those adapted to use homogeneous charge compression ignition (HCCI) strategies. The methods are applicable to systems utilizing multi-pulse fuel injection events per cylinder per engine cycle, e.g., a system employing a pilot injection for fuel reforming, a main injection event for engine power, and, where applicable, a post-combustion fuel injection event for aftertreatment management, each which affects cylinder pressure.

Sensing devices are installed on or near the engine to monitor physical characteristics and generate signals which are correlatable to engine and ambient parameters. The sensing devices include a crankshaft rotation sensor, including a crank sensor 44 for monitoring crankshaft speed (RPM) through sensing edges on the teeth of the multi-tooth target wheel 26. The crank sensor is known, and may include, e.g., a Hall-effect sensor, an inductive sensor, or a magnetoresistive sensor. Signal output from the crank sensor 44 (RPM) is input to the control module 5. There is a combustion pressure sensor 30, including a pressure sensing device adapted to monitor in-cylinder pressure (COMB_PR). The combustion pressure sensor 30 preferably includes a non-intrusive device including a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the sensor 30. The output signal, COMB_PR, of the sensing element of sensor 30 is proportional to cylinder pressure. The sensing element of sensor 30 includes a piezo-ceramic or other device adaptable as such. Other sensing devices preferably include a manifold pressure sensor for monitoring manifold pressure (MAP) and ambient barometric pressure (BARO), a mass air flow sensor for monitoring intake mass air flow (MAF) and intake air temperature ($T_{IN}$), and, a coolant sensor 35 monitoring coolant temperature (COOLANT). The system may include an exhaust gas sensor for monitoring states of one or more exhaust gas parameters, e.g., temperature, air/fuel ratio, and constituents. One skilled in the art understands that there may other sensing devices and methods for purposes of control and diagnostics. The operator input, in the form of the operator torque request, (To_REQ), is typically obtained through a throttle pedal and a brake pedal, among other devices. The engine is preferably equipped with other sensors for monitoring operation and for purposes of system control. Each of the sensing devices is signally connected to the control module 5 to provide signal information which is transformed by the control module to information representative of the respective monitored parameter. It is understood that this configuration is illustrative, not restrictive, including the various sensing devices being replaceable with functionally equivalent devices and algorithms.

The actuators are installed on the engine and controlled by the control module 5 in response to operator inputs to achieve various performance goals. Actuators include an electronically-controlled throttle device which controls throttle opening to a commanded input (ETC), and a plurality of fuel injectors 12 for directly injecting fuel into each of the combustion chambers in response to a commanded input (INJ_PW), all of which are controlled in response to the operator torque request (To_REQ). There is an exhaust gas recirculation valve 32 and cooler, which controls flow of externally recirculated exhaust gas to the engine intake, in response to a control signal (EGR) from the control module. The glow-plug 28 includes a known device, installed in each of the combustion chambers, adapted for use with the combustion pressure sensor 30.

The fuel injector 12 is an element of a fuel injection system, which includes a plurality of high-pressure fuel injector devices each adapted to directly inject a fuel charge, including a mass of fuel, into one of the combustion chambers in response to the command signal, INJ_PW, from the control module. Each of the fuel injectors 12 is supplied pressurized fuel from a fuel distribution system, and have operating characteristics including a minimum pulsewidth and an associated minimum controllable fuel flow rate, and a maximum fuel flow rate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

Control module, module, controller, processor and similar terms mean any suitable one or various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module may have a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The control module 5 executes algorithmic code stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift on systems so equipped. The control module is configured to receive input signals from the operator (e.g., a throttle pedal position and a brake pedal position) to determine the operator torque request, To_REQ, and from the sensors indicating the engine speed (RPM) and intake air temperature (Tin), and coolant temperature and other ambient conditions.

Figure 2:
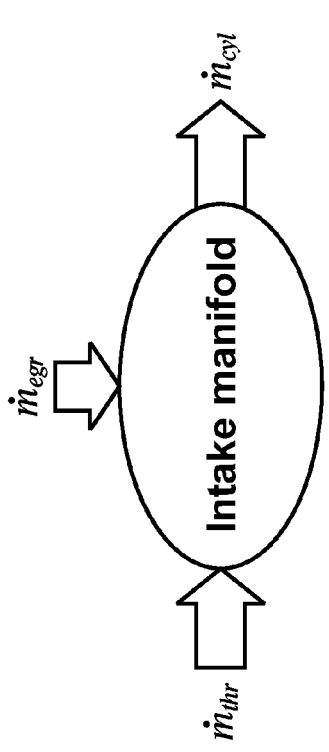
FIG. 2 illustrates a relationship of EGR flow to other flows in an exemplary intake manifold, in accordance with the present disclosure.

To accurately estimate the oxygen concentration in an intake manifold, an accurate estimation of the EGR flow is required. FIG. 2 illustrates a relationship of EGR flow to other flows in an exemplary intake manifold, in accordance with the present disclosure. Cylinder charge flow ($\dot{m}_{cyl}$) or the air mass flow into the engine is a sum of air mass flow through the throttling device ($\dot{m}_{thr}$) and EGR flow ($\dot{m}_{egr}$). Values for $\dot{m}_{cyl}$ are not directly calculable, but an estimate for $\dot{m}_{cyl}$ can be made based upon calibrated results, for example, available as a look-up value based upon precise readings of pressure and temperature in the intake manifold. In another exemplary method, an A/F sensor in the exhaust system can be used to estimate $\dot{m}_{cyl}$ when the EGR valve is closed and $\dot{m}_{thr}$ is the only flow entering the intake manifold. In steady state and with the EGR valve closed, A/F is assumed to be equal to $\dot{m}_{thr}$ divided by the fuel flow rate. When the EGR valve is not closed, $\dot{m}_{thr}$ is only a portion of the flow entering the intake manifold, and, therefore, the A/F sensor cannot directly provide information on EGR flow or cylinder charge flow in steady state. Because the $\dot{m}_{cyl}$ equals the $\dot{m}_{thr}$ plus $\dot{m}_{egr}$, the error in an cylinder charge flow model based upon $\dot{m}_{thr}$ is always equal to the error in an EGR flow model in steady state. In transient conditions, $\dot{m}_{egr}$ can be observable but can also be difficult to isolate from other transient responses. Oxygen concentration methods based upon these calculations depend upon either a cylinder charge flow model of an EGR flow model. One having skill in the art will appreciate that any such model based upon the intake manifold flows, either by open-loop or closed-loop calculation, will be asymptotically stable.

An exemplary method is provided to estimate the EGR flow in a diesel engine using a MAF sensor and a MAP sensor for improved estimation of intake oxygen concentration. Unlike conventional table-based $O_2$ estimation approaches, the present method employs a dynamic observer to track the dynamic effects as well, which makes it more suitable for transient engine controls. It is also more efficient in terms of ease of calibration due to its model-based nature.

It is assumed that mass airflow and intake manifold pressure (boost pressure) are measured using a MAF sensor and a MAP sensor, respectively, and the exhaust air fuel ratio is measured by a wide-range air fuel ratio sensor (A/F sensor), for example located in the exhaust system of the engine. However, it will be appreciated that equivalent methods to quantify the intake air flow and the air to fuel ratio in the exhaust can be used similarly in the methods described herein. A method to estimate the oxygen concentration in an intake manifold includes three parts: 1) adaptive correction of volumetric efficiency, 2) EGR flow estimation based on estimated partial intake pressure due to EGR, and 3) intake oxygen concentration estimation using EGR flow estimation and measured exhaust air fuel ratio.

Volumetric efficiency is a ratio of a volume of air drawn into a cylinder to the displacement of the piston within the cylinder. With regard to adaptive correction of volumetric efficiency, methods enabling a cylinder air charge estimator are known in the art. One known embodiment can be slightly generalized to include the effect of a possible cam-phaser on airflow. The partial pressure of intake manifold p due to fresh air charge, assuming the EGR valve to be closed, can be modeled as expressed by the following equations:

$$\frac{d}{dt}p = \frac{RT}{V}\left(MAF - \eta\frac{p}{p_{int}}W_c(V_{IVC}, V_{EVC}, p_{int}, p_{exh}, N)\right) \quad [1]$$

$$W_c(V_{IVC}, V_{EVC}, p_{int}, p_{exh}, N) = \left(\frac{p_{int}V_{IVC} - p_{exh}V_{EVC}}{RT}\right)\left(\frac{Nn}{120}\right) \quad [2]$$

wherein T is the intake manifold temperature, R is the gas constant, V is the volume of intake manifold, MAF is the mass airflow entering through the throttle body, n is the number of cylinders, $\eta$ is the volumetric efficiency, and $W_c$ is the theoretical mass flow entering cylinders, which is a function of cylinder volumes at intake and exhaust valve closing ($V_{IVC}$ and $V_{EVC}$), engine speed (N), and intake and exhaust manifold pressures ($p_{int}$ and $p_{exh}$). Rearranging Equations 1 and 2 by methods known in the art, it will be appreciated that, with the EGR valve closed and with the system at steady state, one can solve for $\eta$ to provide an updated volumetric efficiency for the engine.

In a diesel engine, airflow though the intake manifold into the engine is controlled by adjusting the EGR valve and boost pressure. The mass airflow entering intake manifold can be measured by a MAF sensor located at the upper stream of intake manifold. The sensor dynamics is approximated by a first order differential equation as expressed by the following equation:

$$\tau\frac{d}{dt}MAF_m + MAF_m = MAF \quad [3]$$

wherein $\tau$ is the time constant of the sensor and $MAF_m$ is the measured mass airflow from the sensor. To eliminate the derivative of the above equation, a new parameter x is introduced as expressed by the following equation.

$$x = p - \frac{RT}{V}\tau MAF_m \quad [4]$$

A combination of Equations 3 and 4 yields the following equation.

$$\frac{d}{dt}x = \frac{RT}{V}\left(MAF_m - \eta\frac{p}{p_{int}}W_c(V_{IVC}, V_{EVC}, p_{int}, p_{exh}, N)\right) \quad [5]$$

The volumetric efficiency is not precisely known, so a model can be used to estimate the airflow entering cylinders as expressed by the following equations:

$$\frac{d}{dt}\hat{x} = \frac{RT}{V}\left(MAF_m - \hat{\eta}\frac{\hat{p}}{p_{int}}W_c(V_{IVC}, V_{EVC}, p_{int}, p_{exh}, N)\right) \quad [6]$$

$$\hat{p} = \hat{x} + \frac{RT}{V}\tau MAF_m \quad [7]$$

$$CAC_{EST} = \hat{\eta}\frac{\hat{p}}{p_{int}}W_c(V_{IVC}, V_{EVC}, p_{int}, p_{exh}, N) \quad [8]$$

wherein $\hat{x}$ is the estimate of x, CACEST is the estimate of the fresh airflow entering cylinders, $\hat{p}$ is the estimate of the partial pressure of intake manifold due to fresh air charge, p, and $\hat{\eta}$ is the approximated volumetric efficiency. In steady state with the EGR closed, $CAC_{EST}$ is always equal to MAF while $\hat{p}$ may not be equal to p depending on accuracy of the approximated volumetric efficiency. The accuracy of airflow estimation can be improved by selectively adjusting or updating the volumetric efficiency $\eta$ based on the error between $\hat{p}$ and p whenever the EGR valve is closed, since intake manifold pressure $p_{int}$ becomes equal to p. The adaptation law of the volumetric efficiency can be derived from the error dynamics, assuming that $p_{exh}$ is known, according to the following equation.

$$\frac{d}{dt}e = \left(\frac{Nn}{120V}\right)(\eta(pV_{IVC} - p_{exh}V_{EVC}) - \hat{\eta}(\hat{p}V_{IVC} - p_{exh}V_{EVC})) \quad [9]$$

-continued $$= \left(\frac{Nn}{120V}\right)(-\eta V_{IVC}e - (\hat{\eta}-\eta)(\hat{p}V_{IVC} - p_{exh}V_{EVC}))$$

The term e can be expressed as $e=\hat{p}-p=\hat{x}-x$. It is assumed that $\eta$ varies slowly in time i.e., $\dot{\eta}\approx 0$ and that the following Lyapunov function is chosen for adaptation law.

$$V = \frac{c_1}{2}e^2 + \frac{c_2}{2}(\hat{\eta}-\eta)^2 > 0, c_1, c_2 > 0 \qquad [10]$$

The time derivative of V is given by the following equation.

$$\frac{dV}{dt} = \left(\frac{Nn}{120V}\right)\left(\begin{array}{c}-c_1\eta V_{IVC}e^2 - \\ c_1 e(\hat{\eta}-\eta)(\hat{p}V_{IVC} - p_{exh}V_{EVC})\end{array}\right) + \qquad [11]$$

$$c_2(\hat{\eta}-\eta)\frac{d\hat{\eta}}{dt}$$

$$= -c_1\eta\left(\frac{Nn}{120V}\right)V_{IVC}e^2 +$$

$$c_2(\hat{\eta}-\eta)\left(\frac{d\hat{\eta}}{dt} - \frac{c_1}{c_2}\left(\frac{Nn}{120V}\right)(\hat{p}V_{IVC} - p_{exh}V_{EVC})e\right)$$

Since $-c_1\eta\left(\frac{Nn}{120V}\right)V_{IVC} < 0, \forall t,$ the following adaptation law can be applied.

$$\frac{d\hat{\eta}}{dt} = \frac{c_1}{c_2}\left(\frac{Nn}{120V}\right)(\hat{p}V_{IVC} - p_{exh}V_{EVC})e \qquad [12]$$

This equation achieves $$\dot{V} = c_1\eta\left(\frac{Nn}{120V}\right)V_{IVC}e^2 \leq 0.$$

However, since the largest invariant set in $\dot{V}=0$ is $\{e=0, \hat{\eta}=\eta\}$, the adaptation law given in Equation 12 achieves $e\to 0, \hat{\eta}\to \eta$ as $t\to\infty$. Once $\hat{\eta}$ converges to $\eta$ at a given operating condition, the value of $\hat{\eta}$ can be stored in a look-up table for the case the operating condition is revisited.

Once $\eta$ has been estimated, the EGR flow can be estimated based on the partial pressure of the intake manifold due to EGR which is approximated by $p_i-\hat{p}$, where $p_i$ represents the intake manifold pressure. It is assumed that $\hat{\eta}$ was adjusted using the adaptation algorithm and is approximately equal to $\eta$. The partial intake pressure due to EGR, $p_{EGR}$, can be modeled according to the following equation.

$$\frac{d}{dt}p_{EGR} = \frac{RT}{V}\left(W_{EGR} - \eta\frac{p_{EGR}}{p_{int}}W_c(V_{IVC}, V_{EVC}, p_{int}, p_{exh}, N)\right) \qquad [13]$$

Since $W_{EGR}$ or EGR flow is not precisely known, a model can be used to approximate $p_{EGR}$, yielding the following equation:

$$\frac{d}{dt}\hat{p}_{EGR} = \frac{RT}{V}\left(\hat{W}_{EGR} - \hat{\eta}\frac{\hat{p}_{EGR}}{p_{int}}W_c(V_{IVC}, V_{EVC}, p_{int}, p_{exh}, N)\right) \qquad [14]$$

wherein $\hat{p}_{EGR}$, is an estimate of $p_{EGR}$, and $\hat{W}_{EGR}$ is an estimate of EGR flow. It is assumed that $\hat{p}\approx p$, thus $p_{EGR}\approx p_{int}-\hat{p}$ and the unknown $W_{EGR}$ is considered as a disturbance to the system. The EGR flow estimator can then be used to find a control law for $\hat{W}_{EGR}$ that achieves $\hat{p}_{EGR}\to p_{EGR}$ with unknown disturbance $W_{EGR}$. The error dynamics can be approximated based on the assumption that $\hat{\eta}\approx\eta$ according to the following equation.

$$\frac{d}{dt}e_p \approx -\frac{\hat{\eta}}{p_{int}}W_c(V_{IVC}, V_{EVC}, p_{int}, p_{exh}, N)e_p + \frac{RT}{V}(\hat{W}_{EGR} - W_{EGR}) \qquad [15]$$

The term $e_p$ can be expressed by $e_p=\hat{p}_{EGR}-p_{EGR}\approx\hat{p}_{EGR}-p_{int}-\hat{p}$. Such a control law can be designed by augmenting an integrator to the error dynamics, as described by the following equation.

$$\begin{bmatrix}\dot{e}_p \\ \dot{q}\end{bmatrix} = \begin{bmatrix}-\frac{\hat{\eta}}{p_{int}}W_c(V_{IVC}, V_{EVC}, p_{int}, p_{exh}, N) & 0 \\ 1 & 0\end{bmatrix} \qquad [16]$$

$$\begin{bmatrix}e_p \\ q\end{bmatrix} + \begin{bmatrix}\frac{RT}{V} \\ 0\end{bmatrix}\hat{W}_{EGR} + \begin{bmatrix}0 \\ -\frac{RT}{V}\end{bmatrix}W_{EGR}$$

The designed control law $\hat{W}_{EGR}=k_1 e_p+k_2 q$ ($k_1, k_2 \in \Re$) can compensate unknown disturbance $W_{EGR}$ and achieve $\hat{p}_{EGR}\to p_{EGR}$.

Once partial pressures within the intake manifold and the resulting flows have been estimated, intake oxygen concentration estimation can be determined using the estimated EGR flow and methods known in the art. The dynamics of burnt gas fractions in both intake and exhaust manifold can be expressed according to the following equation:

$$\begin{bmatrix}\dot{f}_{exh} \\ \dot{f}_{int}\end{bmatrix} = \begin{bmatrix}-\frac{\eta W_c}{m_{exh}} & \frac{\eta W_c}{m_{exh}} \\ \frac{W_{EGR}}{m_{int}} & -\frac{MAF + W_{EGR}}{m_{int}}\end{bmatrix}\begin{bmatrix}f_{exh} \\ f_{int}\end{bmatrix} + \begin{bmatrix}\frac{1+\lambda_s}{m_{exh}} \\ 0\end{bmatrix}W_f \qquad [17]$$

wherein $f_{int}$ and $f_{exh}$ are burnt gas fractions in intake and exhaust manifolds, respectively, $W_f$ is the mass fuel flow rate, $\lambda_s$ is the stoichiometric air fuel ratio, and $m_{int}$ and $m_{exh}$ are the masses of intake and exhaust manifold, respectively, which can be calculated based on the ideal gas law. In a lean-burn engine, the burnt gas fraction in the exhaust manifold can be directly calculated from the air fuel ratio measurement, $\lambda_{exh}$, at the exhaust pipe as follows.

$$f_{exh} = \frac{1+\lambda_s}{1+\lambda_{exh}} \qquad [18]$$

To design an estimator, the change of coordinate can be performed according to the following equation:

$$\begin{bmatrix} \hat{f}_{exh} \\ \hat{f}_\Delta \end{bmatrix} = \begin{bmatrix} 0 & \frac{\eta W_c}{m_{exh}} \\ -\frac{MAF}{m_{int}} & -\frac{MAF+W_{EGR}}{m_{int}} - \frac{\eta W_c}{m_{exh}} \end{bmatrix} \begin{bmatrix} f_{exh} \\ f_\Delta \end{bmatrix} + \begin{bmatrix} \frac{1+\lambda_s}{m_{exh}} \\ -\frac{1+\lambda_s}{m_{exh}} \end{bmatrix} W_f \quad [19]$$

wherein $f_\Delta$ can be defined as $f_\Delta = f_{int} - f_{exh}$. A reduced-order Luenberger observer can, therefore, be designed according to the following equations.

$$\dot{\hat{z}} = F\hat{z} + Gf_{exh} + HW_f$$

$$\hat{f}_{int} = \hat{f}_\Delta + f_{exh} = \hat{z} + Lf_{exh} + f_{exh} \quad [20]$$

Terms for Equation 20 can be defined as follows.

$$F = -\frac{MAF+W_{EGR}}{m_{int}} - \frac{\eta W_c}{m_{exh}} - L\frac{\eta W_c}{m_{exh}}$$

$$G = \left(-\frac{MAF+W_{EGR}}{m_{int}} - \frac{\eta W_c}{m_{exh}} - L\frac{\eta W_c}{m_{exh}}\right)L - \frac{MAF}{m_{int}}$$

$$H = -\frac{1+\lambda_s}{m_{exh}} - L\frac{1+\lambda_s}{m_{exh}}$$

The observer gain L is chosen to −1 to cancel the uncertainty in $W_f$, while assuring F has a stable eigenvalue. The resulting first-order estimator can be expressed by the following equation.

$$\dot{\hat{z}} = \left(-\frac{MAF+\hat{W}_{EGR}}{\hat{m}_{int}}\right)\hat{z} + \frac{\hat{W}_{EGR}}{\hat{m}_{int}} f_{exh} \quad [21]$$

$$\hat{f}_{int} = \hat{z} - Lf_{exh} + f_{exh}$$

The intake oxygen concentration can be derived from the estimated burnt gas fraction in the intake manifold based on constituents of dry air (one mole of $O_2$ to one mole of $N_2$=1:3.8) according to the following equation.

$$O_2(\% \text{ volume}) = (1 - \hat{f}_{int}) \times \frac{1}{1+3.8} \times 100 \quad [22]$$

Figure 3:
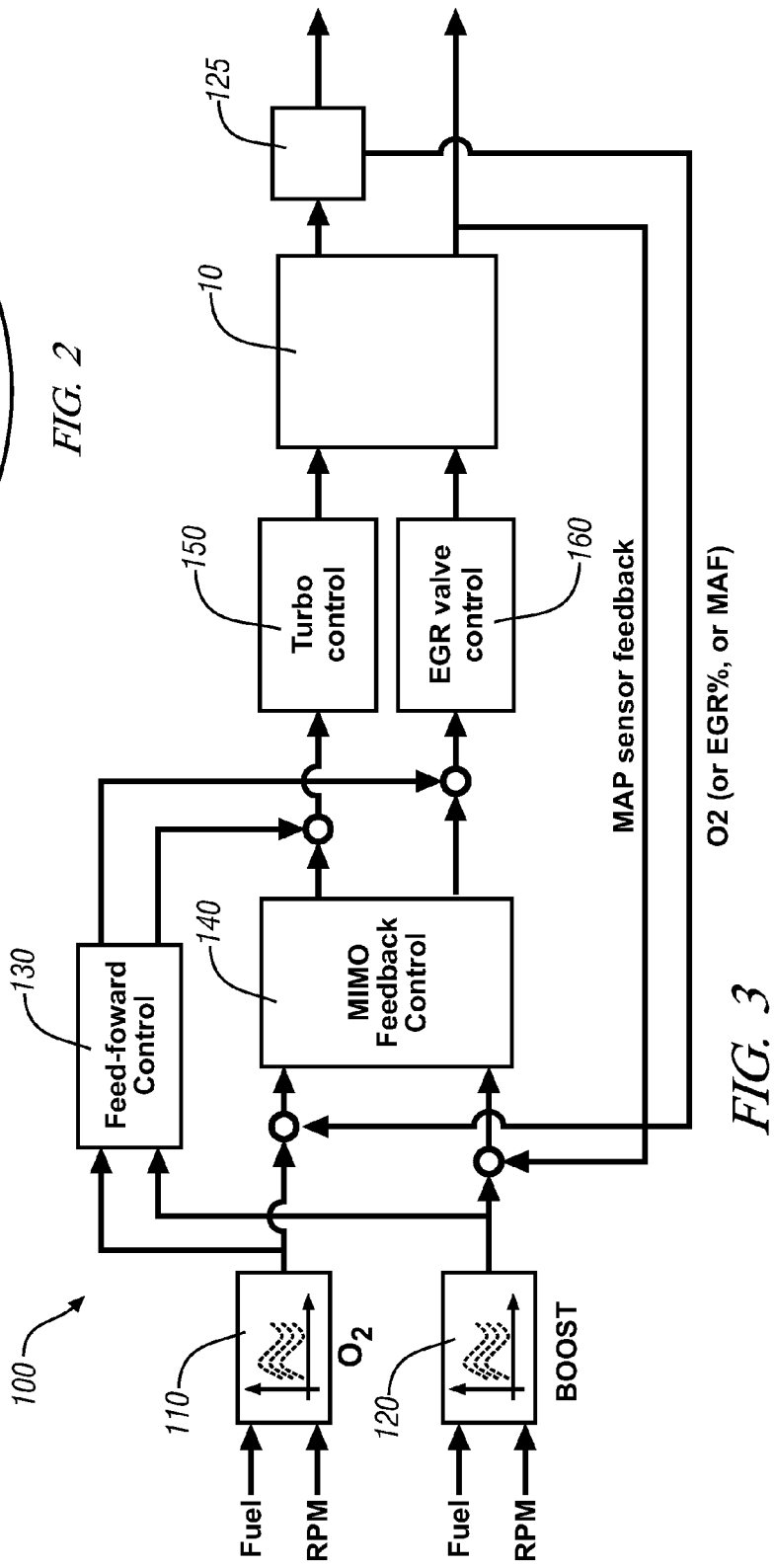
FIG. 3 schematically illustrates an exemplary engine configuration capable of employing the methods described herein, in accordance with the present disclosure.

FIG. 3 schematically illustrates an exemplary engine configuration capable of employing the methods described herein, in accordance with the present disclosure. Engine configuration 100 includes engine 10, oxygen requirement module 110, boost requirement module 120, oxygen estimation module 125, feed forward controller 130, feedback controller 140, turbo controller 150, and EGR valve controller 160. Oxygen requirement module 110 inputs fuel flow data and engine RPM data and outputs an oxygen requirement for engine operation or a desired oxygen concentration based upon current conditions. This output is summed with an oxygen estimation from oxygen estimation module 125 to describe an adjusted oxygen requirement. The exemplary process of FIG. 3 depicts oxygen concentration as being the basis of the calculations in modules 130 and 140 based upon input from oxygen requirement module 110 and oxygen estimation module 125. However, it will be appreciated that similar calculations can be performed based upon EGR % or MAF signals from module 125, quantifying the resulting EGR flow and resulting conditions within the intake manifold, and the disclosure is not intended to be limited to the particular exemplary embodiment embodied herein. Boost requirement module 120, similar to module 110, inputs fuel flow data and engine RPM data to determine a boost required from the turbocharger or a desired boost based upon current conditions. This output is summed with a MAP sensor feedback to describe an adjusted boost requirement. Feed forward controller 130 inputs the oxygen and boost requirements and uses predictive methods to generate control signals. Similarly, feedback controller 140 inputs the adjusted oxygen and adjusted boost requirements and uses feedback or closed-loop feedback control methods to generate control signals. The control signals from each the feed forward controller 130 and the feedback controller 140 are summed and used as inputs to the turbo controller 150 and the EGR valve controller 160. Within the exhaust system, oxygen estimation module 125 applies methods described herein and provides the oxygen estimation for use as described above.

Figure 4:
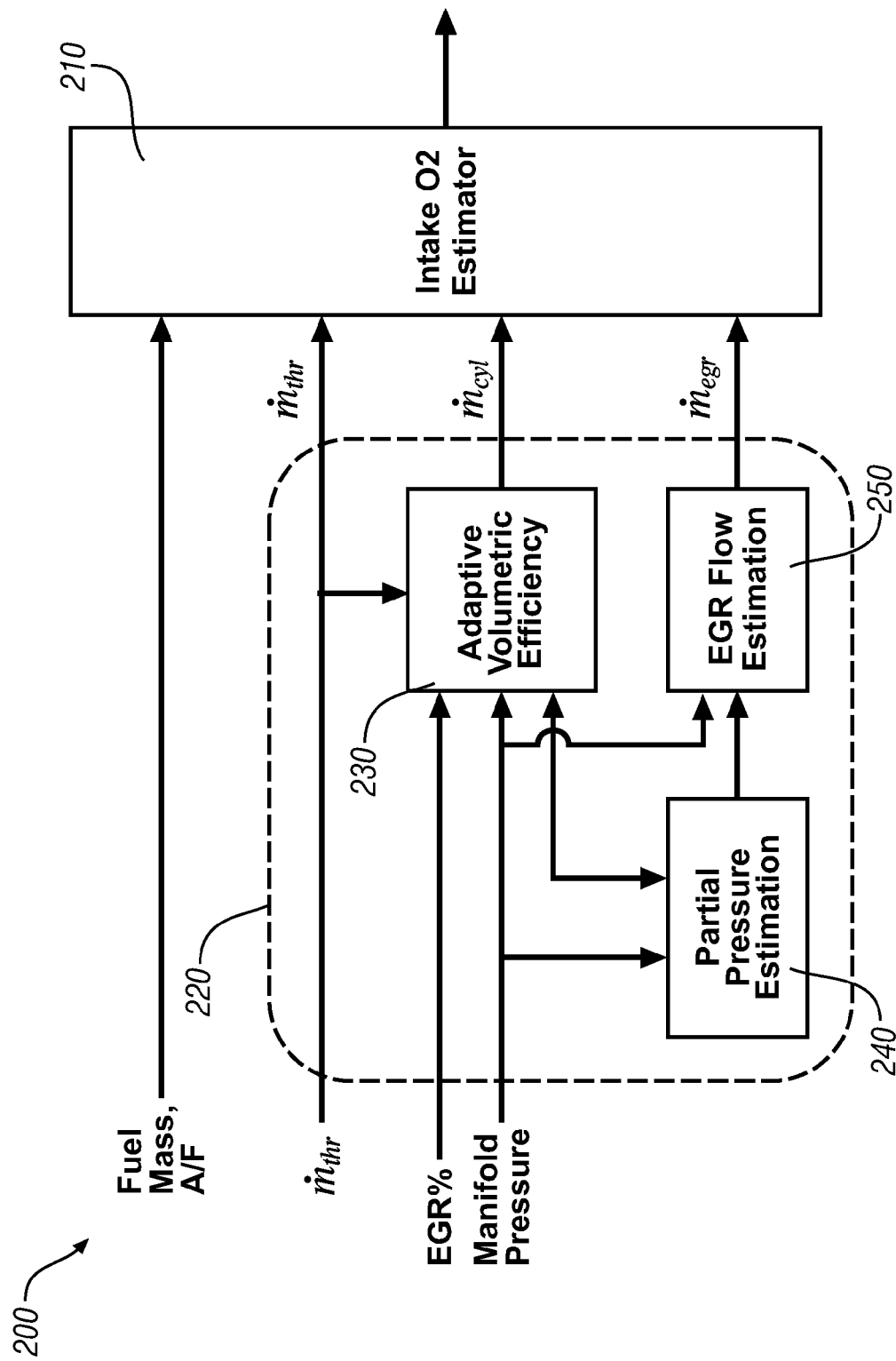
FIG. 4 schematically depicts an exemplary flow of information accomplishing methods described herein, in accordance with the present disclosure.

FIG. 4 schematically depicts an exemplary flow of information accomplishing methods described herein, in accordance with the present disclosure. Information flow 200 includes an intake oxygen estimator 210, and a flow estimation module 220. The intake oxygen estimator 210 uses methods known in the art to estimate oxygen concentration in an intake manifold, for example, describing the output of module 125 in FIG. 3, based upon accurate estimates of flows entering and exiting the manifold, and fuel mass and A/F terms to quantify oxygen content in the EGR flow resulting from lean engine operation. The flow estimation module 220 includes an adaptive volumetric efficiency module 230, a partial pressure due to fresh air module 240, and an EGR flow estimation module 250 and provides flow terms to the intake oxygen estimator 210. $\dot{m}_{thr}$ is measurable by methods known in the art and is an input to flow estimation module 220. Volumetric efficiency, as described above, is useful to determine flow into the cylinder or cylinders of an engine. Adaptive volumetric efficiency module 230 inputs $\dot{m}_{thr}$, EGR %, manifold pressure, and partial pressure estimates within the intake manifold and applies methods described herein to output $\dot{m}_{cyl}$. Using $\dot{m}_{cyl}$ and manifold pressure as inputs, partial pressure due to fresh air module 240 utilizes methods known in the art to determine a proportion of $\dot{m}_{cyl}$ attributable to $\dot{m}_{thr}$. One will appreciate that output from module 240 is useful to describe an estimated partial intake pressure due to EGR. This proportion, along with $\dot{m}_{cyl}$ and manifold pressure, are used as inputs to EGR flow estimation module 250 in order to generate $\dot{m}_{egr}$. Outputs from flow estimation module include $\dot{m}_{thr}$, $\dot{m}_{egr}$, and $\dot{m}_{cyl}$, and intake oxygen estimator utilizes these inputs, for example, in an intake manifold model configured according to methods described herein, to output an oxygen concentration estimation.

Figure 5:
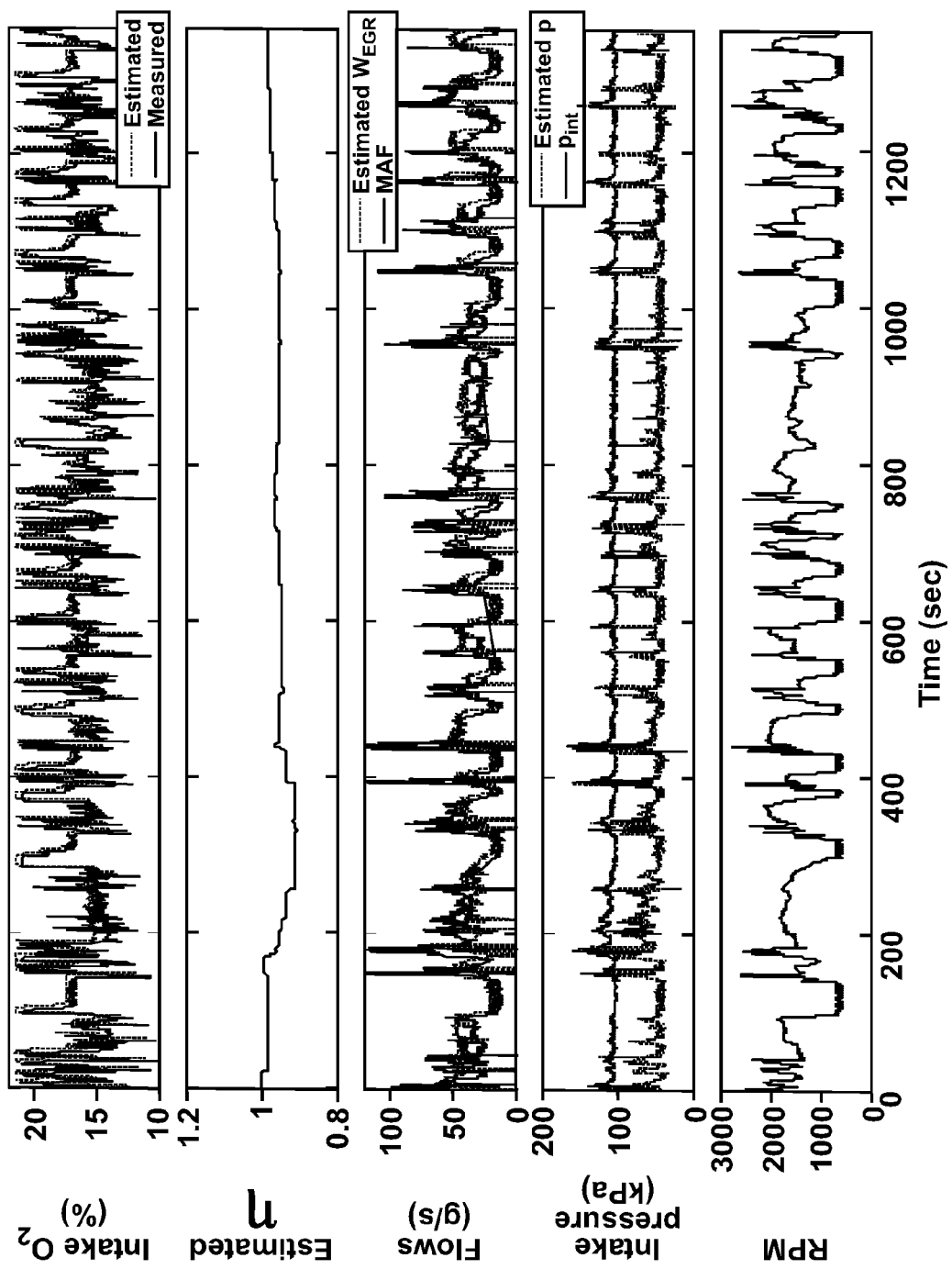
FIG. 5 illustrates exemplary experimental test results in a wide time scale, in accordance with the present disclosure.
Figure 6:
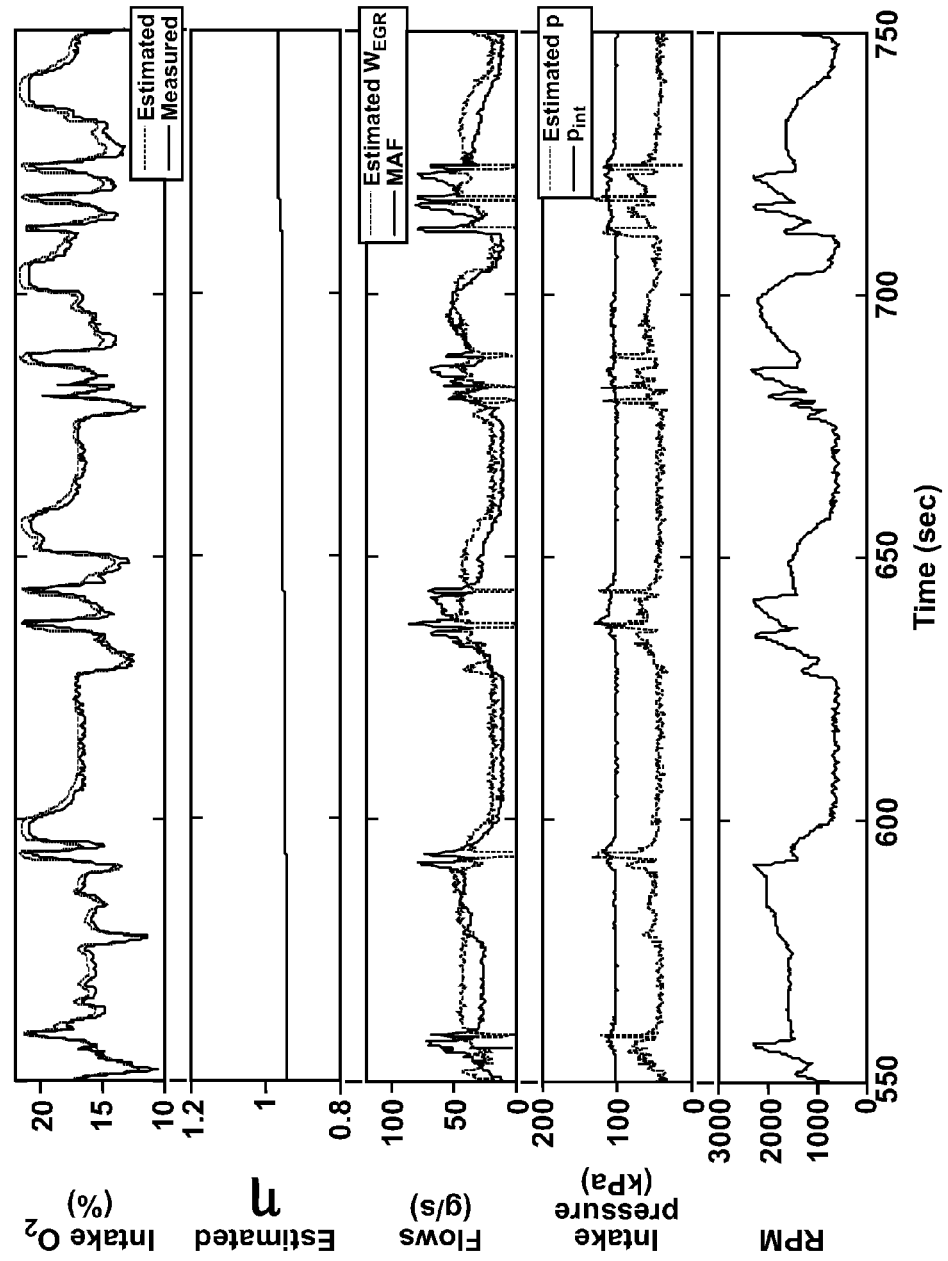
FIG. 6 illustrates in greater detail data from FIG. 5 in a narrower time scale, in accordance with the present disclosure.

Experimental data can be utilized to validate the methods described above. FIGS. 5 and 6 graphically illustrate exemplary experimental test results describing results achieved according to methods described herein, in accordance with the present disclosure. The depicted data resulted from operation of an exemplary 4.9 liter, V6, diesel engine located in a vehicle. An oxygen sensor, thermocouple, as well as the pressure sensor were implemented to experimentally measure or validate the states of intake manifold. The experimental results are shown in FIG. 5 through a wide time scale. FIG. 6 illustrates in greater detail data from FIG. 5 in a narrower time scale. FIG. 5 shows that the estimated intake oxygen concentration is closely following the measured intake oxygen concentration as the volumetric efficiency is corrected by the disclosed methods as compared to the baseline estimation. The averaged estimation error in the exemplary experimental data of the data collected by the methods described herein was calculated to be 3.7%, as determined according to the following equation.

$$\text{Average Error} = \frac{1}{T}\int_0^T \frac{|\text{Estimated } O_2 - \text{Measured } O_2|}{\text{Measured } O_2} dt \quad [23]$$

FIG. 6 shows the experimental data zoomed in from 550 to 750 sec. Referencing the intake oxygen estimation results of both FIGS. 5 and 6 and comparing the results to the experimentally measured oxygen levels in the intake manifold, it is evident that the methods disclosed herein provide an accurate estimation of intake oxygen levels.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for estimating an oxygen concentration in an intake manifold of a diesel engine utilizing exhaust gas recirculation, the method comprising:
   monitoring engine operation;
   monitoring an exhaust gas recirculation valve;
   monitoring an exhaust air fuel ratio;
   when the engine operates in steady state with the exhaust gas recirculation valve in the closed position, updating a volumetric efficiency for the engine;
   determining a partial pressure due to exhaust gas recirculation within the intake manifold based upon the updated volumetric efficiency;
   determining an estimated oxygen concentration within the intake manifold based upon the partial pressure due to exhaust gas recirculation within the intake manifold and the exhaust air fuel ratio; and
   controlling operation of the engine based upon the estimated oxygen concentration within the intake manifold.

2. The method of claim 1, wherein updating the volumetric efficiency for the engine comprises:
   monitoring an air mass flow through a throttling device upstream of the intake manifold;
   equating an air mass flow into the engine to the air mass flow through the throttling device; and
   determining an updated volumetric efficiency based upon the air mass flow into the engine.

3. The method of claim 2, wherein monitoring the engine operation comprises:
   determining the engine to be operating in the steady state based upon the air mass flow through the throttling device.

4. The method of claim 1, wherein determining the estimated oxygen concentration within the intake manifold based upon the partial pressure due to exhaust gas recirculation within the intake manifold and the exhaust air fuel ratio comprises:
   monitoring an intake manifold pressure;
   determining an exhaust gas recirculation flow based upon the partial pressure due to exhaust gas recirculation within the intake manifold and the intake manifold pressure; and
   determining the estimated oxygen concentration within the intake manifold based upon the exhaust gas recirculation flow and the exhaust air fuel ratio.

5. The method of claim 1, further comprising storing the updated volumetric efficiency for the engine as look-up value for subsequent use.

6. Method for operating a turbo-charged diesel engine utilizing exhaust gas recirculation, the method comprising:
   monitoring a desired oxygen concentration within the intake manifold;
   determining an estimated oxygen concentration within the intake manifold, comprising:
     monitoring a mass air flow into the intake manifold;
     determining the engine to be at steady state based upon the mass air flow;
     monitoring an exhaust gas recirculation valve setting;
     when the engine is at steady state and the exhaust gas recirculation valve setting is closed, adjusting a volumetric efficiency;
     monitoring an air fuel ratio in an exhaust system of the engine;
     determining an exhaust gas recirculation flow based upon the volumetric efficiency; and
     determining the estimated oxygen concentration within the intake manifold based upon the exhaust gas recirculation flow and the air fuel ratio; and
   controlling operation of the engine based upon a comparison of the desired oxygen concentration to the estimated oxygen concentration.

7. The method of claim 6, wherein determining an exhaust gas recirculation flow based upon the volumetric efficiency comprises determining a partial pressure in the intake manifold due to the exhaust gas recirculation flow based upon the volumetric efficiency.

8. The method of claim 7, wherein determining the partial pressure in the intake manifold due to the exhaust gas recirculation flow comprises:
   monitoring an intake manifold pressure;
   determining the partial pressure in the intake manifold due to the intake air flowing into the intake manifold based upon the intake manifold pressure and the volumetric efficiency; and
   calculating the partial pressure in the intake manifold due to the exhaust gas recirculation flow by subtracting the partial pressure in the intake manifold due to the intake air flowing into the intake manifold from the intake manifold pressure.

9. System for estimating an oxygen concentration in an intake manifold of a turbo-charged diesel engine utilizing exhaust gas recirculation, the system comprising:
   the intake manifold receiving an intake air flow and an exhaust gas recirculation flow and providing an air mass flow into the engine;
   a mass air flow sensor located in the intake air flow upstream of the intake manifold;
   an intake manifold pressure sensor;
   an air fuel ratio sensor located in an exhaust system of the engine;
   an exhaust gas recirculation valve;
   an intake oxygen estimator module:
     adjusting a volumetric efficiency based on the data from the air flow sensor and data from the pressure sensor when the exhaust gas recirculation valve is closed and the engine is at steady state;
     determining a flow rate of the exhaust gas recirculation flow based upon the volumetric efficiency; and determining an estimated oxygen concentration in the intake manifold based upon the data from the mass air flow sensor, the flow rate of the exhaust gas recirculation flow, and data from the air fuel ratio sensor; and a control module adjusting operation of the engine based upon the oxygen concentration in the intake manifold.

10. The system of claim 9, further comprising a module outputting a desired oxygen concentration in the intake manifold; and wherein the control module adjusting operation of the engine based upon the oxygen concentration in the intake manifold applies feedback control based upon the desired oxygen concentration in the intake manifold and the estimated oxygen concentration in the intake manifold.

11. The system of claim 10, wherein the feedback control is further based upon a desired boost requirement.

12. The system of claim 9, wherein the control module adjusting operation of the engine based upon the oxygen concentration in the intake manifold adjusts a turbo control based upon the oxygen concentration in the intake manifold.

13. The system of claim 9, wherein the control module adjusting operation of the engine based upon the oxygen concentration in the intake manifold adjusts an exhaust gas recirculation valve control based upon the oxygen concentration in the intake manifold.

14. The system of claim 9, wherein the control module adjusting operation of the engine based upon the oxygen concentration in the intake manifold adjusts a turbo control and an exhaust gas recirculation valve control based upon the oxygen concentration in the intake manifold.

* * * * *